United States Patent
Westin (10) Patent No.: US 8,917,309 B1
(45) Date of Patent: Dec. 23, 2014

(54) KEY FRAME DISTRIBUTION IN VIDEO CONFERENCING

(75) Inventor: Patrik Westin, Stockholm (SE)

(73) Assignee: Google, Inc., Mountain View, CA (US)

( * ) Notice: Subject to any disclaimer, the term of this patent is extended or adjusted under 35 U.S.C. 154(b) by 388 days.

(21) Appl. No.: 13/415,267

(22) Filed: Mar. 8, 2012

(51) Int. Cl.
H04N 7/14 (2006.01)
H04L 12/16 (2006.01)
G06F 15/16 (2006.01)

(52) U.S. Cl.
USPC ........................................ 348/14.08; 709/204

(58) Field of Classification Search
USPC ................................ 348/14.01, 14.09, 14.13
See application file for complete search history.

(56) References Cited

U.S. PATENT DOCUMENTS

| | | | |
|---|---|---|---|
| 3,381,273 | A | 4/1968 | Stark et al. |
| 5,778,082 | A | 7/1998 | Chu et al. |
| 5,801,756 | A | 9/1998 | Iizawa |
| 5,914,949 | A | 6/1999 | Li |
| 5,936,662 | A | 8/1999 | Kim et al. |
| 5,953,050 | A | 9/1999 | Kamata et al. |
| 5,963,547 | A | 10/1999 | O'Neil et al. |
| 6,011,868 | A | 1/2000 | van den Branden et al. |
| 6,028,639 | A | 2/2000 | Bhatt et al. |
| 6,072,522 | A | 6/2000 | Ippolito et al. |
| 6,163,335 | A | 12/2000 | Barraclough |
| 6,453,336 | B1 | 9/2002 | Beyda et al. |
| 6,603,501 | B1 | 8/2003 | Parry et al. |
| 6,614,936 | B1 | 9/2003 | Wu et al. |
| 6,621,514 | B1 | 9/2003 | Hamilton |
| 6,658,618 | B1 | 12/2003 | Gu et al. |
| 6,757,259 | B1 | 6/2004 | Hamilton |
| 6,775,247 | B1 | 8/2004 | Shaffer et al. |
| 6,795,863 | B1 | 9/2004 | Doty, Jr. |
| 6,941,021 | B2 | 9/2005 | Goldstein et al. |
| 6,992,692 | B2 | 1/2006 | Gu et al. |
| 7,007,098 | B1 | 2/2006 | Smyth et al. |

(Continued)

FOREIGN PATENT DOCUMENTS

| | | |
|---|---|---|
| WO | WO2008066593 | 6/2008 |
| WO | WO2010059481 | 5/2010 |
| WO | WO2010111275 | 9/2010 |
| WO | WO2011150128 | 12/2011 |

OTHER PUBLICATIONS

Schulzrinne, et al., "RTP: A Transport Protocol for Real-Time Applications," Network Working Group RFC 3550 (The Internet Society 2003).

(Continued)

*Primary Examiner* — Duc Nguyen
*Assistant Examiner* — Theodore Ndje
(74) *Attorney, Agent, or Firm* — Young Basile Hanlon & MacFarlane P.C.

(57) ABSTRACT

A system, apparatus, and method for relaying video information that is part of a multi-party video communication session having multiple endpoints. The server can receive multiple video information streams from multiple endpoints and retransmit some or all of the video information streams to the endpoints with one or more of the video information steams identified as having active status and being decoded at high resolution at the endpoints, while transmitting key frames from video information streams not having active status. Upon switching active speaker status to a new video information stream, the endpoints, already having a key frame from the switched-to video information, can switch to decoding the new video information stream having active status at high resolution without delay.

20 Claims, 5 Drawing Sheets

(56) References Cited

U.S. PATENT DOCUMENTS

| | | | |
|---|---|---|---|
| 7,123,696 | B2 | 10/2006 | Lowe |
| 7,133,362 | B2 | 11/2006 | Chu et al. |
| 7,143,432 | B1 | 11/2006 | Brooks et al. |
| 7,206,016 | B2 | 4/2007 | Gu |
| 7,253,831 | B2 | 8/2007 | Gu |
| 7,321,384 | B1 | 1/2008 | Wu et al. |
| 7,349,944 | B2 | 3/2008 | Vernon et al. |
| 7,352,808 | B2 | 4/2008 | Ratakonda et al. |
| 7,477,282 | B2 | 1/2009 | Firestone et al. |
| 7,558,221 | B2 | 7/2009 | Nelson et al. |
| 7,593,031 | B2 | 9/2009 | Root et al. |
| 7,619,645 | B2 | 11/2009 | Cockerton |
| 7,627,886 | B2 | 12/2009 | Barbanson et al. |
| 7,646,736 | B2 | 1/2010 | Yang et al. |
| 7,664,057 | B1 | 2/2010 | Wu et al. |
| 7,698,724 | B1 | 4/2010 | Day |
| 7,707,247 | B2 | 4/2010 | Dunn et al. |
| 7,716,283 | B2 | 5/2010 | Thukral |
| 7,759,756 | B2 | 7/2010 | Lee et al. |
| 7,856,093 | B2 | 12/2010 | Fujimori et al. |
| 7,864,251 | B2 | 1/2011 | Gu et al. |
| RE42,288 | E | 4/2011 | Degioanni |
| 7,920,158 | B1 | 4/2011 | Beck et al. |
| 7,973,857 | B2 | 7/2011 | Ahmaniemi et al. |
| 7,987,492 | B2 | 7/2011 | Liwerant et al. |
| 8,010,652 | B2 | 8/2011 | Wang et al. |
| 8,060,608 | B2 | 11/2011 | Wang et al. |
| 8,117,638 | B2 | 2/2012 | Perlman |
| 8,164,618 | B2 * | 4/2012 | Yang et al. .................. 348/14.09 |
| 8,228,982 | B2 | 7/2012 | Qian et al. |
| 8,264,521 | B2 | 9/2012 | Triplicane et al. |
| 8,265,168 | B1 | 9/2012 | Masterson et al. |
| 8,276,195 | B2 | 9/2012 | Hegde et al. |
| 8,379,677 | B2 | 2/2013 | Leung et al. |
| 8,527,649 | B2 | 9/2013 | Wexler et al. |
| 8,549,571 | B2 | 10/2013 | Loher et al. |
| 2001/0042114 | A1 | 11/2001 | Agraharam et al. |
| 2002/0033880 | A1 | 3/2002 | Sul et al. |
| 2002/0118272 | A1 | 8/2002 | Bruce-Smith |
| 2003/0091000 | A1 | 5/2003 | Chu et al. |
| 2003/0160862 | A1 | 8/2003 | Charlier et al. |
| 2004/0119814 | A1 | 6/2004 | Clisham et al. |
| 2005/0008240 | A1 | 1/2005 | Banerji et al. |
| 2005/0062843 | A1 | 3/2005 | Bowers et al. |
| 2005/0140779 | A1 | 6/2005 | Schulz et al. |
| 2006/0023644 | A1 | 2/2006 | Jang et al. |
| 2006/0164552 | A1 | 7/2006 | Cutler |
| 2007/0005804 | A1 | 1/2007 | Rideout |
| 2007/0035819 | A1 | 2/2007 | Bahatt et al. |
| 2007/0081794 | A1 | 4/2007 | Baynger et al. |
| 2007/0127671 | A1 | 6/2007 | Chua et al. |
| 2007/0200923 | A1 | 8/2007 | Eleftheriadis et al. |
| 2007/0206091 | A1 | 9/2007 | Dunn et al. |
| 2007/0280194 | A1 | 12/2007 | Wu et al. |
| 2007/0294346 | A1 * | 12/2007 | Moore et al. .................. 709/204 |
| 2008/0218582 | A1 | 9/2008 | Buckler |
| 2008/0246834 | A1 | 10/2008 | Lunde et al. |
| 2008/0267282 | A1 | 10/2008 | Kalipatnapu et al. |
| 2008/0316297 | A1 | 12/2008 | King et al. |
| 2009/0045987 | A1 | 2/2009 | Cho et al. |
| 2009/0079811 | A1 | 3/2009 | Brandt |
| 2009/0164575 | A1 | 6/2009 | Barbeau et al. |
| 2009/0174764 | A1 | 7/2009 | Chadha et al. |
| 2010/0091086 | A1 | 4/2010 | Hagen |
| 2010/0141655 | A1 | 6/2010 | Belinsky et al. |
| 2010/0271457 | A1 | 10/2010 | Thapa |
| 2010/0302446 | A1 | 12/2010 | Mauchly et al. |
| 2011/0018962 | A1 | 1/2011 | Lin et al. |
| 2011/0040562 | A1 | 2/2011 | Doyle et al. |
| 2011/0074910 | A1 | 3/2011 | King et al. |
| 2011/0074913 | A1 | 3/2011 | Kulkarni et al. |
| 2011/0131144 | A1 | 6/2011 | Ashour et al. |
| 2011/0141221 | A1 | 6/2011 | Satterlee et al. |
| 2011/0205332 | A1 | 8/2011 | Jeong et al. |
| 2011/0206113 | A1 | 8/2011 | Bivolarsky et al. |
| 2012/0327172 | A1 | 12/2012 | El-Saban et al. |
| 2013/0088600 | A1 | 4/2013 | Wu et al. |
| 2013/0176383 | A1 | 7/2013 | Satterlee et al. |

OTHER PUBLICATIONS

Babonneau, et al., "SSRC Multiplexing for Unicast and Multicast RTP Sessions ," Network Working Group Internet-Draft (IETF Trust 2010).

Bankoski et al. "Technical Overview of VP8, An Open Source Video Codec for the Web". Dated Jul. 11, 2011.

Bankoski et al. "VP8 Data Format and Decoding Guide; draft-bankoski-vp8-bitstream-02" Network Working Group. Internet-Draft, May 18, 2011, 288 pp.

Cisco WebEx, "Share Ideas With Anyone, Anywhere—Online", Cisco WebEx Meeting Center, Product Overview, 2011 (2 pp).

Cisco, "Cisco TelePresence Product Portfolio", Brochure, 2011 (5 pp).

Firestone, S., et al. "Lip Synchronization in Video Conferencing." Voice and Video Conferencing Fundamentals. Cisco Systems, Inc. Mar. 2007.

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

Overview; VP7 Data Format and Decoder. Version 1.5. On2 Technologies, Inc. Dated Mar. 28, 2005.

Schulzrinne, H., et al. RTP: A Transport Protocol for Real-Time Applications, RFC 3550. The Internet Society. Jul. 2003.

Series H: Audiovisual and Multimedia Systems; Infrastructure of audiovisual services—Coding of moving video. H.264. Advanced video coding for generic audiovisual services. International Telecommunication Union. Version 11. Dated Mar. 2009.

Series H: Audiovisual and Multimedia Systems; Infrastructure of audiovisual services—Coding of moving video. H.264. Advanced video coding for generic audiovisual services. International Telecommunication Union. Version 12. Dated Mar. 2010.

Series H: Audiovisual and Multimedia Systems; Infrastructure of audiovisual services—Coding of moving video. H.264. Amendment 2: New profiles for professional applications. International Telecommunication Union. Dated Apr. 2007.

Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.

Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union Dated Jun. 2006.

Series H: Audiovisual and Multimedia Systems; Infrastructure of audiovisual services—Coding of moving video; Advanced video coding for generic audiovisual services. H.264. Version 1. International Telecommunication Union. Dated May 2003.

Series H: Audiovisual and Multimedia Systems; Infrastructure of audiovisual services—Coding of moving video; Advanced video coding for generic audiovisual services. H.264. Version 3. International Telecommunication Union. Dated Mar. 2005.

VP6 Bitstream & Decoder Specification. Version 1.02. On2 Technologies, Inc. Dated Aug. 17, 2006.

VP6 Bitstream & Decoder Specification. Version 1.03. On2 Technologies, Inc. Dated Oct. 29, 2007.

VP8 Data Format and Decoding Guide. WebM Project. Google On2. Dated: Dec. 1, 2010.

* cited by examiner

FIG. 5

# KEY FRAME DISTRIBUTION IN VIDEO CONFERENCING

TECHNICAL FIELD

The present disclosure relates in general to video conferencing.

BACKGROUND

An increasing number of applications today make use of video information for various purposes including, for example, remote business meetings via video conferencing, high definition video entertainment, video advertisements and sharing of user-generated videos. As technology is evolving, users have higher expectations for video quality and expect high resolution video with smooth playback.

An application of video information encoding and decoding includes multi-party video communications such as video conferencing. In such video conferencing, multiple endpoints can communicate with each other via a server. The endpoints can generate and transmit video information to a server. The server can receive the video information from the endpoints and transmit one or more video information streams to the endpoints based on the received video information.

SUMMARY

Embodiments of systems, methods, and apparatuses for multi-party video communications are disclosed herein. Aspects of the disclosed embodiments include a method for relaying video information that is part of a multi-party video communication session having multiple endpoints including receiving, at a server, first encoded video information that has originated at a first endpoint of the multi-party video communication session and receiving, at the server, second encoded video information that has originated at a second endpoint of the multi-party video communication session, the second encoded video information including at least one key frame. The method also includes transmitting, to at least a third endpoint of the multi-party video communication session, the received first encoded video information while the first endpoint has an active status, processing the second encoded video information at the server to extract therefrom the at least one key frame while the second endpoint does not have an active status, and transmitting, to the third endpoint, the extracted at least one key frame while the first endpoint has the active status and the second endpoint does not have the active status.

Another aspect of the disclosed embodiments is an apparatus for relaying video information that is part of a multi-party video communication session having multiple endpoints. The apparatus comprises a server including a memory and a processor configured to execute instructions stored in the memory to receive first encoded video information that has originated at a first endpoint of the multi-party video communication session, receive second encoded video information that has originated at a second endpoint of the multi-party video communication session, the second encoded video information including at least one key frame, transmit the first encoded video information while the first endpoint has an active status to at least a third endpoint of the multi-party video communication session, extract at least one key frame from the second encoded video information, and transmit the extracted at least one key frame to the third endpoint while the first endpoint has the active status and the second endpoint does not have an active status.

Yet another aspect of the disclosed embodiments is a method for relaying video information that is part of a multi-party video communication session having multiple endpoints. The method comprises receiving, at a third endpoint of the multi-party video communication session, first encoded video information that has originated at a first endpoint of the multi-party video communication session, and receiving second encoded video information that has originated at a second endpoint of the multi-party video communication session at the third endpoint while the first endpoint has an active status and the second endpoint does not have an active status. The method also includes receiving at least one key frame for the second encoded video information at the third endpoint while the first endpoint has the active status and the second endpoint does not have the active status, the at least one key frame received separate from the second encoded video information, and rendering the second encoded video information using the at least one key frame when the second endpoint transitions to have the active status.

These and other embodiments will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

As mentioned briefly above, digital video is used for various purposes including, for example, remote business meetings via video conferencing, high definition video entertainment, video advertisements, and sharing of user-generated videos. As technology is evolving, users have higher expectations for video quality and expect high resolution video even when video information is transmitted over communications channels having limited bandwidth. Video information can include unencoded digital video streams or digital video streams encoded according to the above described formats. The terms video information and video information stream will be used interchangeably hereafter.

Aspects of the disclosed embodiments include systems and methods for relaying video information that is part of a multi-party video communications session. An example of a multi-party video communications session can be video conferencing, where participants at endpoints can communicate video information with other participants at other endpoints. An exemplary endpoint can include a computing device. Throughout this disclosure the term "computing device" includes any device capable of processing information including without limitation: handheld devices, laptop computers, desktop computers, special purpose computers, routers, bridges, and general purpose computers programmed to perform the techniques described herein. Video communications can include transferring video information using a network or networks which could be wired or wireless local area networks (LANs), wide area networks (WANs) or virtual private networks (VPNs), including the Internet or cellular telephone systems, for example, or any other means of transferring video information between computing devices. A participant can include a person, prerecorded video information or video information generated by a computing device, for example.

Multi-party video communications sessions can include relaying video information among endpoints using a server. An exemplary server can include a computing device. Relaying video information using a server can include receiving, at a server, video information transmitted from endpoints and transmitting, from the server, some or all of the received video information to be received at endpoints. Transmitting video information can include outputting, from a computing device, video information to a network, memory, or storage device such as disk drive or removable storage device such as a CompactFlash (CF) card, Secure Digital (SD) card, or the like. Receiving video information can include inputting, at a computing device, video information from a network, memory or storage device such as a disk drive or removable storage device such as a CompactFlash (CF) card, Secure Digital (SD) card, or the like.

The server can also select the spatial and temporal resolution at which to relay video information among endpoints. The term "select" as used herein means to identify, construct, determine, specify or otherwise select in any manner whatsoever. The endpoints can select which of the received video information to display and the spatial and temporal resolution at which to display the selected video information. The selection of which video information the server transfers to endpoints at which resolution and the selection of which video information endpoints display at which resolution can depend upon active status. Active status is associated with one or more of the video information streams to indicate, for example, that the video information stream is associated with a speaking participant in a video conference. A server, for example, can use active status to select the associated video information for transfer at high resolution. An endpoint, for example, can use the active status to select the associated video information for display at high resolution.

Aspects of the disclosed embodiments include identifying active status for one or more of the video information streams. The term "identify" as used herein means to select, construct, determine, specify or otherwise identify in any manner whatsoever. In a multi-party video communications session, active status can indicate which video information can be associated with a speaking participant, for example. The server can transmit the active status to the endpoints along with the video information. The video information having active status can be transmitted by the server to the endpoints at higher resolution than video information not having active status, for example. Although an example describes active status indicating a speaking participant and thus uses the term active speaker status, in general the designation of active status or active speaker status does not require verbal communication. The designation could instead be conferred on any participant whose video stream could be of a higher interest than another participant. This could occur, for example, where a participant self-designates themselves as having active status so that attention is drawn to the images they produce. Alternatively, another participant could select a participant that they wish to view, conferring active status. Other ways of designating active status are possible.

Resolution, when applied to video information, can refer to the properties of the displayed video information. Spatial resolution, which refers to the number of pixels per frame of the video information and can be expressed as a pair of numbers that specify the number of pixels in the horizontal and vertical directions. Examples of video information resolutions can include HD, which represents a resolution of 1920×1080 pixels, VGA, which represents a resolution of 640×480 pixels, and QVGA, which represents a resolution of 320×240 pixels. Resolution can also mean color resolution, which applies to the number and meaning of the bits used to represent each pixel. For example, a pixel can include 32 bits that represent the colors red, blue, green and an overlay channel, each represented in eight bits. Other types of encodings are possible that employ more or fewer bits to represent a pixel, for example reducing the number of bits used to represent each color. Resolution can also mean temporal resolution, which includes the number of frames per second to be displayed. Examples of temporal resolutions can include 60 frames per second (fps), 30 fps, 15 fps and static frames. Switching the resolution of video information can include changing any or all of spatial, color or temporal resolutions.

An endpoint receiving multiple video information streams can render and display a video information stream having active status at high resolution and can display the remaining video information streams at lower resolution, for example. In other cases, the server can transfer multiple video information streams at high resolution and an endpoint receiving the video information streams can select a video information stream having active status for display at high resolution and display the remaining video information streams at a lower resolution. Video information is rendered by a computing device to convert it to a format suitable for display on a display device. Rendering can mean, for example, decoding an encoded video information stream into frames and formatting the frames to appropriate X and Y dimensions and bit depth using a computing device that will permit it to be transferred to a display in a format and at a rate that will provide an acceptable viewing experience.

Active status can switch from one video information stream to a different video information stream during a multi-party video communications session. Switching can occur when the server receives information transmitted by an endpoint or when the server receives information generated by a computing device. When the identified active status switches from a first video information stream to a second video information stream, endpoints receiving the streams of video information can change the resolution at which the first and second streams of video information are displayed. For example, if a first video information stream has active status, the video information can be displayed at high resolution.

Upon receiving an indication that the active status has switched from a first video information stream to a second video information stream, the endpoint can switch to displaying the first video information stream at low resolution and begin displaying the second video information stream at high resolution. Since the video information streams can be encoded, changing the display resolution of a video information stream to high resolution can use a key frame. Providing key frames to endpoints by transmitting the key frames from a server when active status switches from one video information stream to a different video information stream can introduce delay in decoding the video information stream by the endpoint and can cause the video information being displayed to be visibly interrupted. Transmitting key frames to endpoints when active status changes can also cause network congestion.

Disclosed embodiments can permit faster switching of video information resolution at endpoints by extracting at least one key frame from a second video information stream at a server while a first video information stream has active status, storing the extracted key frame at the server and sending the extracted key frame to one or more endpoints during times of excess bandwidth while the first video information stream is being transmitted. The endpoints receive and store the extracted key frame and when active status switches to the second video information stream, the endpoints can read the stored key frame and begin decoding the second video information stream at the new resolution without having to wait for key frames to be sent from the server. This can save time in switching resolution at the endpoints and can avoid network congestion caused by attempting to transmit key frames to multiple endpoints at the same time.

Figure 1:
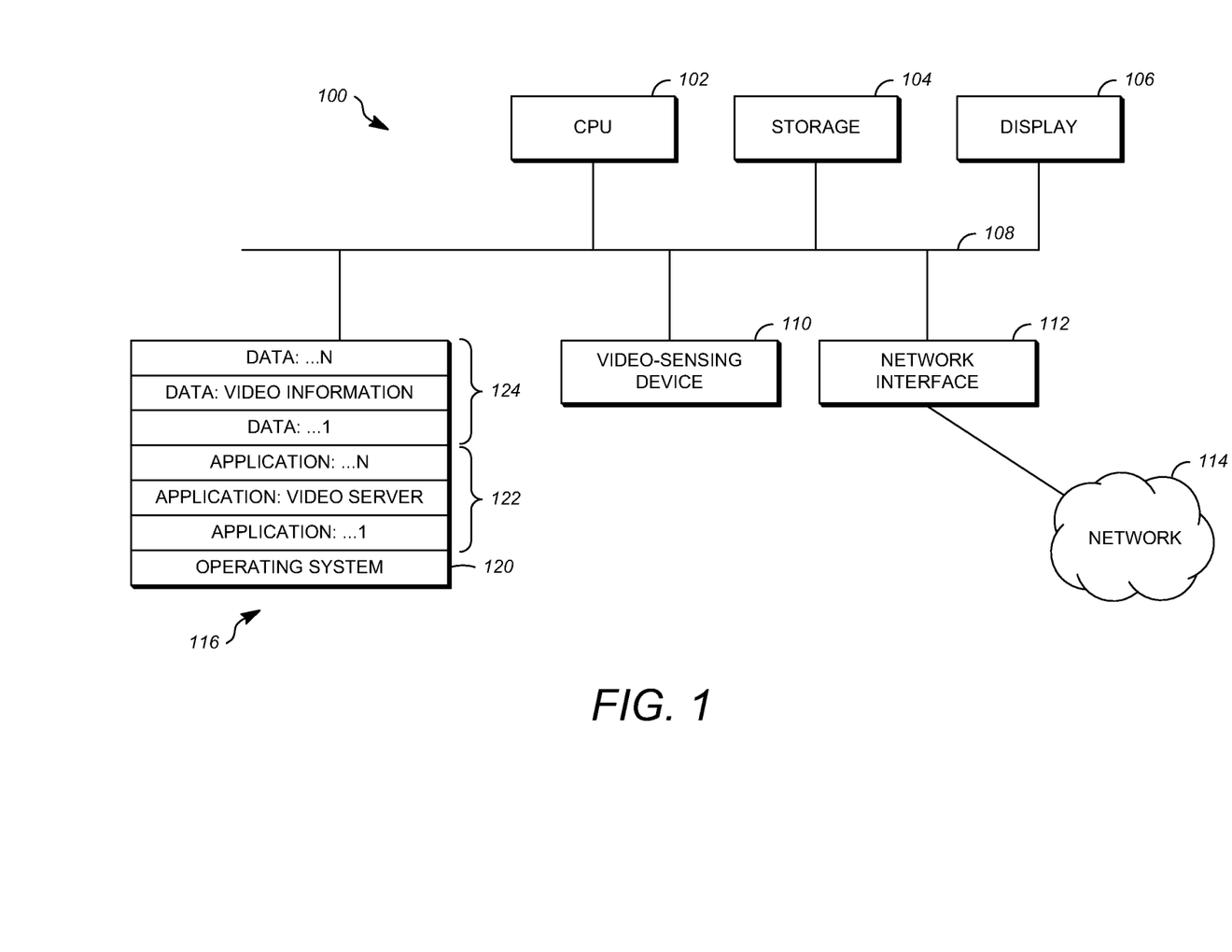
FIG. 1 is a schematic diagram of a computing device in accordance with an embodiment.

These and other examples are now described with reference to the accompanying drawings. FIG. 1 is a schematic diagram of a computing device 100 in accordance with an embodiment. Computing device 100 can be in the form of a computing system including multiple computing devices, or in the form of a single computing device, for example, a mobile phone, a tablet computer, a laptop computer, a notebook computer, a desktop computer, and the like.

Further, all or a portion of disclosed embodiments can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

CPU 102 in computing device 100 can be a conventional central processing unit. Alternatively, CPU 102 can be any other type of device, or multiple devices, capable of manipulating or processing information now-existing or hereafter developed. Although the disclosed embodiments can be practiced with a single processor as shown, e.g. CPU 102, advantages in speed and efficiency can be achieved using more than one processor.

Memory 116 in computing device 100 can include random access memory (RAM) and/or read-only memory (ROM). Any other suitable type of storage device can be used as memory 116. Memory 116 can include application programs or code 122 and data 124 that is accessed by CPU 102 using a bus 108. Memory 116 can further include an operating system 120. Application programs 122 include programs that permit CPU 102 to perform the methods described here. For example, application programs 122 can include applications 1 through N that further include a video communication application that performs the methods described herein. Computing device 100 can also include a secondary storage 104, which can, for example, be a memory card used with a mobile computing device 100. Because the video communication sessions may contain a significant amount of information, they can be stored in whole or in part in the secondary storage 104 and loaded into memory 116 as needed for processing.

Computing device 100 can also include one or more output devices, such as display 106, which can be a touch sensitive display that combines a display with a touch sensitive element that is operable to sense touch inputs. Display 106 can be coupled to CPU 102 via bus 108. Other output devices that permit a user to program or otherwise use computing device 100 can be provided in addition to or as an alternative to display 108. When the output device is or includes a display, the display can be implemented in various ways, including by a liquid crystal display (LCD) or a cathode-ray tube (CRT) or light emitting diode (LED) display, such as an OLED display.

Computing device 100 can also include or be in communication with an image-sensing device 110, for example a camera, or any other image-sensing device 110 now existing or hereafter developed that can sense the image of a device user operating computing device 100 and generate a video information stream. Image-sensing device 110 can be positioned such that it is directed toward a device user that is operating computing device 110. For example, the position and optical axis of image-sensing device 110 can be configured such that the field of vision includes an area that is directly adjacent to display 106, from which the display 106 is visible. Image-sensing device 110 can be configured to receive images, for example, of the face of a device user while the device user is operating computing device 100.

Computing device 100 can also include or be in communication with a sound-sensing device 126, for example a microphone or any other sound-sensing device now existing or hereafter developed that can sense the sounds made by the user operating computing device 100. Sound-sensing device 126 can be positioned such that it is directed toward the user operating computing device 100. Sound-sensing device 126 can be configured to receive sounds, for example, speech or other utterances made by the user while the user operates computing device 100.

Computing device 100 can also be in communication with a network interface 112 via bus 108. Network interface 112 can permit CPU 102 to communicate with a network 114 to send and receive data. Network 114 can be a wired or wireless local area network or a wide area network such as the Internet, for example.

Although FIG. 1 depicts CPU 102 and memory 116 of computing device 100 as being integrated into a single unit, other configurations can be utilized. The operations of CPU 102 can be distributed across multiple machines (each machine having one or more of processors) that can be coupled directly or across a local area or other network. Memory 116 can be distributed across multiple machines such as network-based memory or memory in multiple machines performing the operations of computing device 100. Although depicted here as a single bus, bus 108 of computing device 100 can be composed of multiple buses. Further, secondary storage 104 can be directly coupled to the other components of computing device 100 or can be accessed via network interface 112 and can comprise a single integrated unit such as a memory card or multiple units such as multiple memory cards. Computing device 100 can thus be implemented in a wide variety of configurations.

Figure 2:
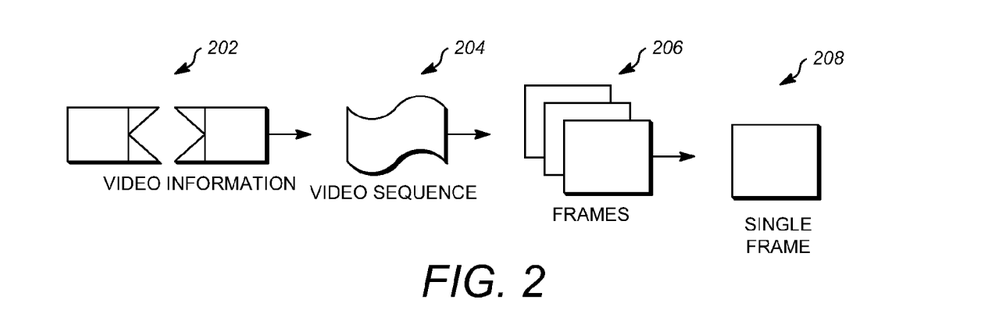
FIG. 2 is a diagram of a video stream encoded and decoded in accordance with an embodiment.

FIG. 2 is a diagram of a video stream 202 encoded and decoded in accordance with an embodiment. An aspect of video coding formats having a defined hierarchy of layers is that video information encoded at a given resolution can be decoded at that resolution or a set number of predetermined lower resolutions without causing significant additional processing overhead at the decoder. This can permit a multi-party video communications session server to transmit video information at high resolution and permit endpoints to decode the video information at a selected lower resolution. Video stream 202 includes video information in the form of a video sequence 204. At the next level, video sequence 204 includes a number of adjacent frames 206. While three frames are depicted in adjacent frames 206, video sequence 204 can include any number of adjacent frames. Adjacent frames 206 can then be further subdivided into a single frame 208.

Figure 3:
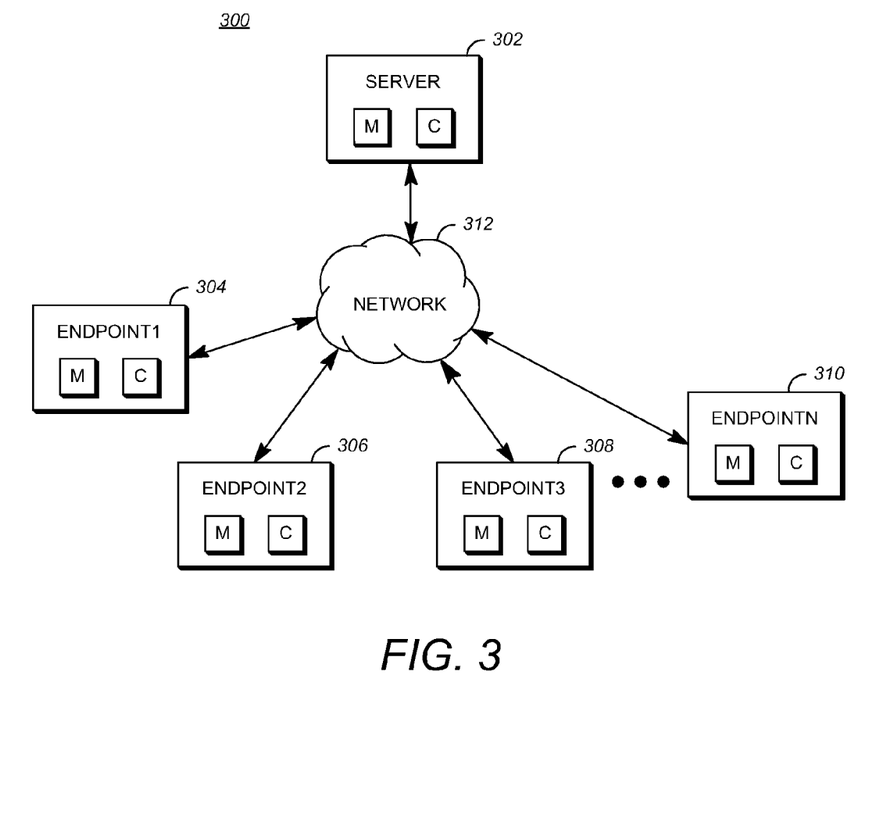
FIG. 3 is a schematic diagram of a multi-party video communications system in accordance with an embodiment.

FIG. 3 is a diagram of a multi-party video communications system 300 in accordance with an embodiment. Multi-party video communications system 300 includes a server 302 and endpoint1 304 through endpointN 310. Server 302 and endpoint1 304 to endpointN 310 can communicate via a network 312, which can be one or more networks including a wired or wireless local area network (LAN), virtual private network (VPN) or wide area network (WAN) such as the Internet or cellular telephone system. Embodiments of server 302 and endpoint1 304 through endpointN 310 (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of server 302 and endpoint1 304 through endpointN 310 do not necessarily have to be implemented in the same manner.

In one embodiment, for example, server 302 and endpoint1 304 through endpointN 310 can be implemented using computing device 100 with a computer program that, when executed, carries out any of the respective methods, algorithms and/or instructions described herein. In addition or alternatively, for example, a special purpose computer/processor can be utilized that contains specialized hardware for carrying out any of the methods, algorithms, or instructions described herein.

Server 302 and endpoint1 304 through endpointN 310 can, for example, be implemented on a computing device. Alternatively, server 302 can be implemented on a general purpose computing device and endpoint1 304 through endpointN 310 can be implemented on computing devices separate from server 302, such as hand-held communications devices. In this instance, some or all of endpoint1 304 through endpointN 310 can encode content using an encoder to encode the content into a video information stream and transmit the video information stream to server 302.

Server 302 can receive video information from endpoint1 304 through endpointN 310 and retransmit some or all of the video information to some or all of endpoint1 304 through endpointN 310. Alternatively, server 302 could process some or all of the received video information to select the resolution and extract key frames, for example, and transmit some or all of the video information to some or all of endpoint1 304 through endpointN 310. In turn, endpoint1 304 through endpointN 310 can store or decode the encoded video information using a decoder and display the decoded video information. Alternatively, endpoint1 304 through endpointN 310 can decode video information stored locally thereon, for example. Other suitable implementation schemes for server 302 and endpoints 304, 306, 308 and 310 are available. For example, any or all of endpoint1 304 through endpointN 310 can be generally stationary personal computers rather than portable communications devices.

Figure 4:
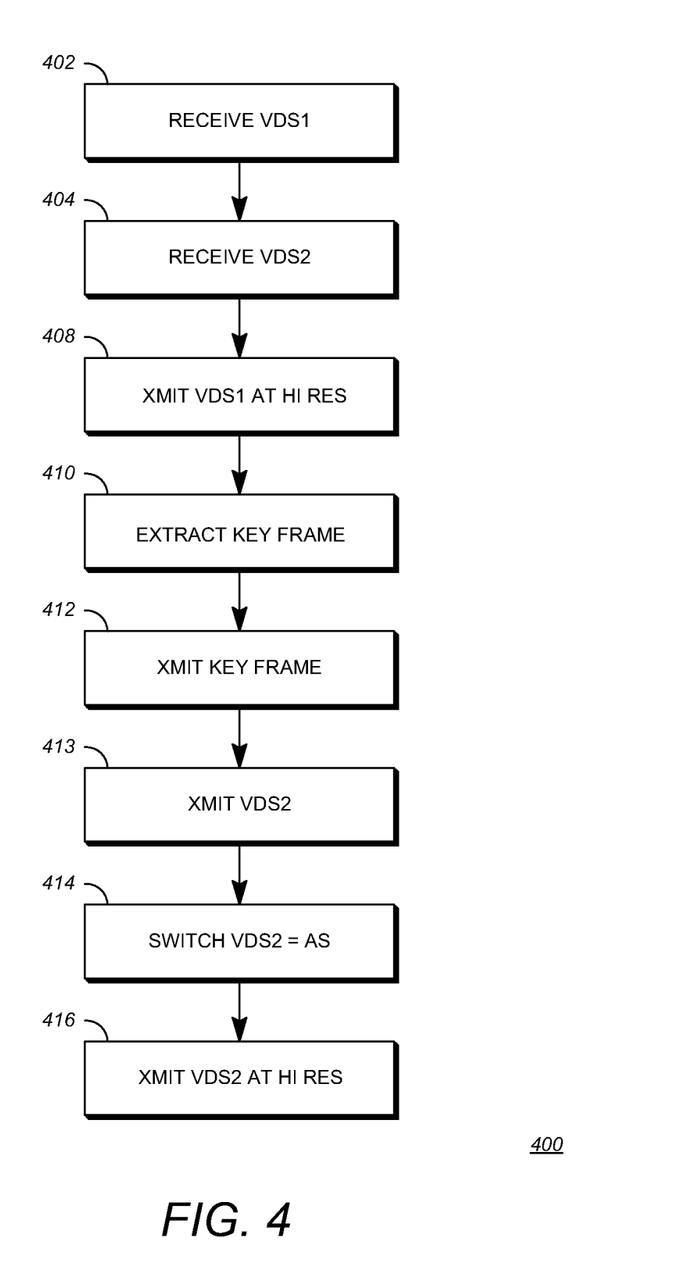
FIG. 4 is a flowchart of a method of operation for an embodiment for relaying video information that is part of a multi-party video communications system.

FIG. 4 is a flowchart of a method of operation 400 for an embodiment for relaying video information that is part of a multi-party video communications system. For simplicity of explanation, the method of operation 400 is depicted and described as a series of steps. However, steps in accordance with this disclosure can occur in various orders and/or concurrently. At step 402, receive VDS1, server 302 receives first encoded video information that has originated at a first endpoint of the multi-party video communications session, for example from endpoint1 304. At step 404, receive VDS2, server 302 receives second encoded video information that has originated at a second endpoint of the multi-party video communication session. The second encoded video information includes at least one key frame, for example from endpoint2 306. At step 408, xmit VDS1 at hi res, the received first encoded video information is transmitted to at least a third endpoint of the multi-party video communications session, for example endpoint3 308, while the first endpoint has an active speaker status.

At step 410, extract key frame, second encoded video information is processed, for example by server 302, to extract therefrom the at least one key frame while the first endpoint has active speaker status and the second endpoint does not have an active speaker status. Server 302 can extract and store the key frame(s) from an encoded video information stream without decoding the video stream data. In some embodiments, server 302 can decode at least a portion of a video information stream, perform processing such as extracting the key frame or changing the resolution of the video data steam and re-encode the video information stream for transmission.

At step 412, xmit key frame, the extracted at least one key frame is transmitted to the third endpoint, for example endpoint3 308, while the first endpoint, for example endpoint1 304, has active speaker status and the second endpoint does not have an active speaker status.

At step 413, xmit VDS2, the second encoded video information is transmitted to the third endpoint, for example endpoint3 308, while the first endpoint, for example endpoint1 304, has an active speaker status and the second endpoint, for example endpoint2 306, does not have an active speaker status. As described in relation to step 408, xmit VDS1 at hi res, the first encoded video information is transmitted to the third endpoint in a manner that permits the third endpoint to render the first encoded video information at a first resolution. The second encoded video information is transmitted to the third endpoint in a manner that permits the third endpoint to render the second encoded video information at a second resolution that is lower that the first resolution.

Server 302 can monitor the condition of network 312 and identify a window or time period of excess bandwidth during transmitting of the first encoded video information. Transmitting the at least one key frame occurs at least in part in the identified window, thereby avoiding the creation of network congestion. The at least one key frame selected for transmission from a plurality of candidate key frames based on a determination of the likelihood that the second endpoint will be a next endpoint to transition to an active speaker status.

At step 414, switch VDS2=AS, a transition of the second endpoint, for example endpoint2 306, to an active speaker status is identified. Also, the second encoded video information is transmitted to at least the third endpoint of the multi-party video communication session after identifying that the second endpoint has an active speaker status. The second encoded video information is configured to permit the third endpoint, for example endpoint3 308, to render at least a portion of the second encoded video information using the at least one key frame transmitted while the second endpoint did not have an active speaker status. This switch can be initiated by, for example, endpoint1 304 relinquishing active speaker status and identifying endpoint2 306 and its associated video information stream as having active speaker status, or by endpoint2 306 identifying itself as having active speaker status or having a computing device in multi-party video communications system 300, possibly server 302, identify endpoint2 306 and its associated video information stream as having active speaker status. When a new video information stream is identified as having active speaker status, in this case the video information stream associated with endpoint2 306, server 302 transmits the new active speaker status to the endpoints 304, 306, 308, 310.

At step 416, xmit VDS2 at hi res, server 302 transmits the video information stream associated with endpoint2 306 at high resolution. Server 302 can switch from transmitting the video information at a lower resolution to a higher resolution or aspects of disclosed embodiments permit server 302 to transmit video information at high resolution and allow the endpoints to select the resolution at which they will decode the video information. In either case a key frame can be required by the endpoints to switch resolutions. Since key frames are distributed in a sparse fashion in video information, the switch from low resolution to high resolution can likely occur between key frames. In known conferencing systems, an endpoint receiving the high resolution video information stream with new active speaker status can either wait until a new key frame occurs in the video stream, request a new key frame from the server or wait for the server to distribute key frames to the endpoint before switching the resolution at which the video information stream is displayed. In disclosed embodiments, endpoint3 308 can already have the key frame stored locally as a result of having received the key frame transmitted at step 412 and can thereby switch resolutions at which the video information stream can be decoded and displayed in less time.

Aspects of disclosed embodiments can reduce the number of key frames transmitted to endpoints from video information streams not having active speaker by anticipating which endpoints and corresponding video information streams are most likely to be identified as active speakers in the future. Examples of algorithms for identifying which endpoint can be most likely to be identified as an active speaker includes keeping track of which endpoints have been so identified the most number of times or for the longest duration during a multi-party video communications session.

Figure 5:
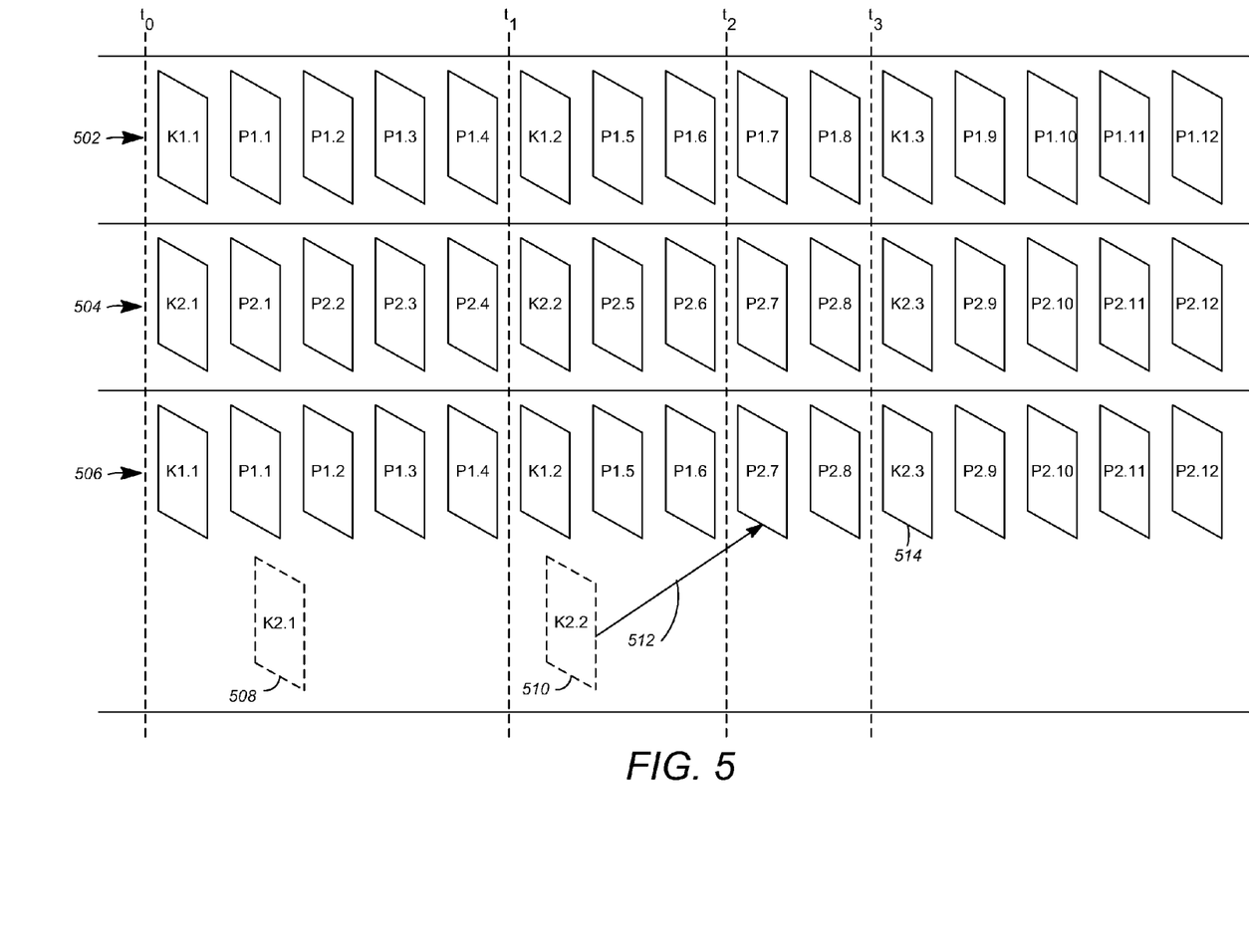
FIG. 5 is a diagram of video frames transmitted in accordance with an embodiment.

FIG. 5 is a diagram showing video information streams transmitted in accordance with an embodiment. The video information streams are shown as a function of time starting at time $t_0$. First video information stream 502 is transmitted to endpoint3 308 by server 302 and has key frames K1.1 through K1.3 and predicted frames P1.1 through P1.12, and second video information stream 504 is transmitted to endpoint3 308 by server 302 having key frames K2.1 through K2.3 and predicted frames P2.1 through P2.12. A composite video information stream 506 is formed by endpoint3 308 from received video information streams 502 and 504 and represents the video information stream to be decoded at high resolution by endpoint3 308. At time $t_0$, video information stream 502 is identified as having active speaker status and endpoint3 308 includes frames K1.1 through P1.6 in video information stream 506 to be decoded, rendered and displayed at high resolution. Also at time $t_0$, key frame K2.1 508 from video information stream 504 associated with endpoint2 306 is extracted from video information stream 504, is transmitted to endpoint3 308 during a time of excess network bandwidth between time $t_0$ and time $t_1$, and is stored at endpoint3 308. At time $t_1$, a new key frame K2.2 510 is extracted from video information stream 504 and is transmitted to endpoint3 308 during a time of excess network bandwidth between time $t_1$ and time $t_2$ by server 302 to replace previous key frame K2.1 508 stored at endpoint3 308. In this way, endpoint3 308 can have the latest key frame available for video information stream 504. At time $t_2$, active speaker status is switched from video information stream 502 to video information stream 504. Since endpoint3 308 has previously stored key frame K2.2 510, endpoint3 308 can insert key frame K2.2 510 into video information stream 506, as shown by arrow 512, switch video information stream 506 from video information stream 502 to video information stream 504, and begin decoding, rendering and displaying video information stream 506 at time $t_2$. If key frame K2.2 512 is not available, endpoint3 308 may have to wait for the next key frame K2.3 514 at time $t_3$ to start decoding video information stream 506, for example.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for relaying video information that is part of a multi-party video communication session having multiple endpoints, the method comprising:
    receiving, at a server, first encoded video information that has originated at a first endpoint of the multi-party video communication session;
    receiving, at the server, second encoded video information that has originated at a second endpoint of the multi-party video communication session, the second encoded video information including at least one intra-coded frame;
    transmitting, to at least a third endpoint of the multi-party video communication session, the received first encoded video information while the first endpoint has an active status;
    processing, at the server, the second encoded video information to extract therefrom the at least one intra-coded frame while the second endpoint does not have the active status; and transmitting, to the third endpoint, the extracted at least one intra-coded frame while the first endpoint has the active status and the second endpoint does not have the active status.

2. The method of claim 1, further comprising:
    transmitting, to at least the third endpoint, the second encoded video information while the first endpoint has an active status and the second endpoint does not have an active status.

3. The method of claim 2 wherein the first encoded video information is transmitted to the third endpoint in a manner that permits the third endpoint to render the first encoded video information at a first resolution.

4. The method of claim 3 wherein the second encoded video information is transmitted to the third endpoint in a manner that permits the third endpoint to render the second encoded video information at a second resolution that is lower than the first resolution.

5. The method of claim 1, further comprising:
    identifying a window of excess bandwidth during transmitting of the first encoded video information; and wherein transmitting the at least one intra-coded frame occurs at least in part in the identified window.

6. The method of claim 1, further comprising:
    selecting the at least one intra-coded frame for transmission from a plurality of candidate intra-coded frame based on a determination of the likelihood that the second endpoint will be a next endpoint to transition to an active status.

7. The method of claim 1, further comprising:
identifying a transition of the second endpoint to an active status; and transmitting, to at least the third endpoint of the multi-party video communication session, the second encoded video information after identifying that the second endpoint has an active status;
wherein the second encoded video information is configured to permit the third endpoint to render at least a portion of the second encoded video information using the at least one intra-coded frame transmitted while the second endpoint did not have an active status.

8. An apparatus for relaying video information that is part of a multi-party video communication session having multiple endpoints, the apparatus comprising:
a server including a memory and a processor configured to execute instructions stored in the memory to:
receive first encoded video information that has originated at a first endpoint of the multi-party video communication session;
receive second encoded video information that has originated at a second endpoint of the multi-party video communication session, the second encoded video information including at least one intra-coded frame;
transmit, to at least a third endpoint of the multi-party video communication session, the first encoded video information while the first endpoint has an active status;
extract at least one intra-coded frame from the second encoded video information; and
transmit the extracted at least one intra-coded frame to the third endpoint while the first endpoint has the active status and the second endpoint does not have an active status.

9. The apparatus of claim 8 wherein the first encoded video information is transmitted to the third endpoint in a manner that permits the third endpoint to render the first encoded video information at a first resolution.

10. The apparatus of claim 9 wherein the second encoded video information is transmitted to the third endpoint in a manner that permits the third endpoint to render the second encoded video information at a second resolution that is lower than the first resolution.

11. The apparatus of claim 8 wherein the processor is further configured to: identify a transition of the second endpoint to the active status; and transmit, to at least the third endpoint, the received second encoded video information in a manner that permits the third endpoint to render the second encoded video information at the first resolution;
wherein the received second encoded video information is configured to permit the third endpoint to render at least a portion of the second encoded video information using the at least one intra-coded frame transmitted while the second endpoint did not have the active status.

12. The apparatus of claim 8 wherein the processor is further configured to: identify a window of excess bandwidth during transmitting of the received first encoded video information; wherein transmitting the encoded portion of the at least one intra-coded frame occurs at least in part in the identified window.

13. The apparatus of claim 8 wherein the processor is further configured to: select the at least one intra-coded frame for transmission from a plurality of candidate intra-coded frame based on a determination of the likelihood that the second endpoint will be the next endpoint to transition to an active status.

14. The apparatus of claim 8 wherein the processor is further configured to:
extract, from the second encoded video information, at least one intra-coded frame without decoding the second encoded video information.

15. A method for relaying video information that is part of a multi-party video communication session having multiple endpoints, the method comprising:
receiving, at a third endpoint of the multi-party video communication session, first encoded video information that has originated at a first endpoint of the multi-party video communication session;
receiving second encoded video information that has originated at a second endpoint of the multi-party video communication session at the third endpoint while the first endpoint has an active status and the second endpoint does not have an active status;
receiving at least one intra-coded frame for the second encoded video information at the third endpoint while the first endpoint has the active status and the second endpoint does not have the active status, the at least one intra-coded frame received separate from the second encoded video information; and
rendering the second encoded video information using the at least one intra-coded frame when the second endpoint transitions to have the active status.

16. The method of claim 15 wherein the first encoded video information is received by the third endpoint in a manner that permits the third endpoint to render the first encoded video information at a first resolution.

17. The method of claim 16 wherein the second encoded video information is received by the third endpoint in a manner that permits the third endpoint to render the second encoded video information at a second resolution that is lower than the first resolution when the second endpoint does not have the active status.

18. The method of claim 15, further comprising:
receiving, at the third endpoint, an indication of a transition of the second endpoint to the active status; and
receiving, at the third endpoint, the second encoded video information in a manner that permits the third endpoint to render the second encoded video information at the first resolution.

19. The method of claim 15 wherein receiving the at least one intra-coded frame occurs at least in part in a window of excess bandwidth between the endpoint and a server transmitting the at least intra-coded frame and the second encoded video information to the third endpoint.

20. The method of claim 15, further comprising: rendering the second encoded video information at a first resolution while the second endpoint does not have the active status; and wherein rendering the second encoded video information using the at least intra-coded frame when the second endpoint has the active status comprises rendering the second encoded video information at a second resolution higher than the first resolution.

* * * * *